ELECTRICAL SOCKET CONTACTS

Filed Sept. 12, 1960 2 Sheets-Sheet 1

STANLEY THOMAS DEAKIN
INVENTOR.
BY John P. Chandler
HIS ATTORNEY.

July 31, 1962 S. T. DEAKIN 3,047,832

ELECTRICAL SOCKET CONTACTS

Filed Sept. 12, 1960 2 Sheets-Sheet 2

STANLEY THOMAS DEAKIN
INVENTOR.

BY John P. Chandler
HIS ATTORNEY.

United States Patent Office 3,047,832

Patented July 31, 1962

3,047,832

ELECTRICAL SOCKET CONTACTS

Stanley Thomas Deakin, Walton-on-Thames, England, assignor to Sealectro Corporation, Walton-on-Thames, England, a corporation of New York Filed Sept. 12, 1960, Ser. No. 55,504
Claims priority, application Great Britain Sept. 11, 1959
7 Claims. (Cl. 339—217)

The invention relates to electrical socket contacts and is especially, but not exclusively, concerned with such contacts to be held or received in a hole or throughway in a moulding of plastic insulating material such as polytetrafluorethylene. The contacts may, for example, be used to receive the contact wires or pins of miniature valves, base-less lamps or transistors.

The invention provides an electrical socket contact in the form of a channel-shaped member of resilient metal, the base of the channel being omitted, or severed from the side walls, along an intermediate portion of the length of the member and the side walls of the channel, or at least one of them, being bowed inwardly along the said portion to provide, within the channel shape, a resilient contact surface or surfaces for engagement with a wire or pin inserted lengthwise along the channel.

The contact may have a locating or fixing projection from the free edge of one or each side wall of the channel preferably adjacent one end thereof and preferably also at a position where the channel has a base attached to the side walls. The projection may lie in the plane of the channel wall.

In one form of the contact the said intermediate portion is nearer to one end of the contact member than it is to the other end and when there is a projection or projections as aforesaid, it or they may be adjacent the said one end.

The contact may have an outward locating or fixing projection from the base of the channel. For example there may be a projection or projections from a side wall or the side walls of the channel beyond the said intermediate portion in one direction and a projection from the channel base beyond the intermediate portion in the other direction.

One end of the member beyond the intermediate portion, preferably other than that having side wall projections, may be arranged to serve as a contact tag (e.g. for soldering thereto of a lead wire) or the base of the channel may be extended, without side walls, to form a flexible tag for attachment to some other part of an installation.

The channel base may, if desired, be deformed outwardly at one end of the contact to form a lead in ramp for a contact pin and the base of the channel at the end of the intermediate portion remote from that end may be similarly deformed.

The contacts may be produced in the form of a continuous strip and subsequently severed therefrom. If the contacts are to be plated (e.g. with gold) this is preferably effected before they are severed from the strip.

Figures 1, 2, 3, 4, 5, 6, 7, 8:
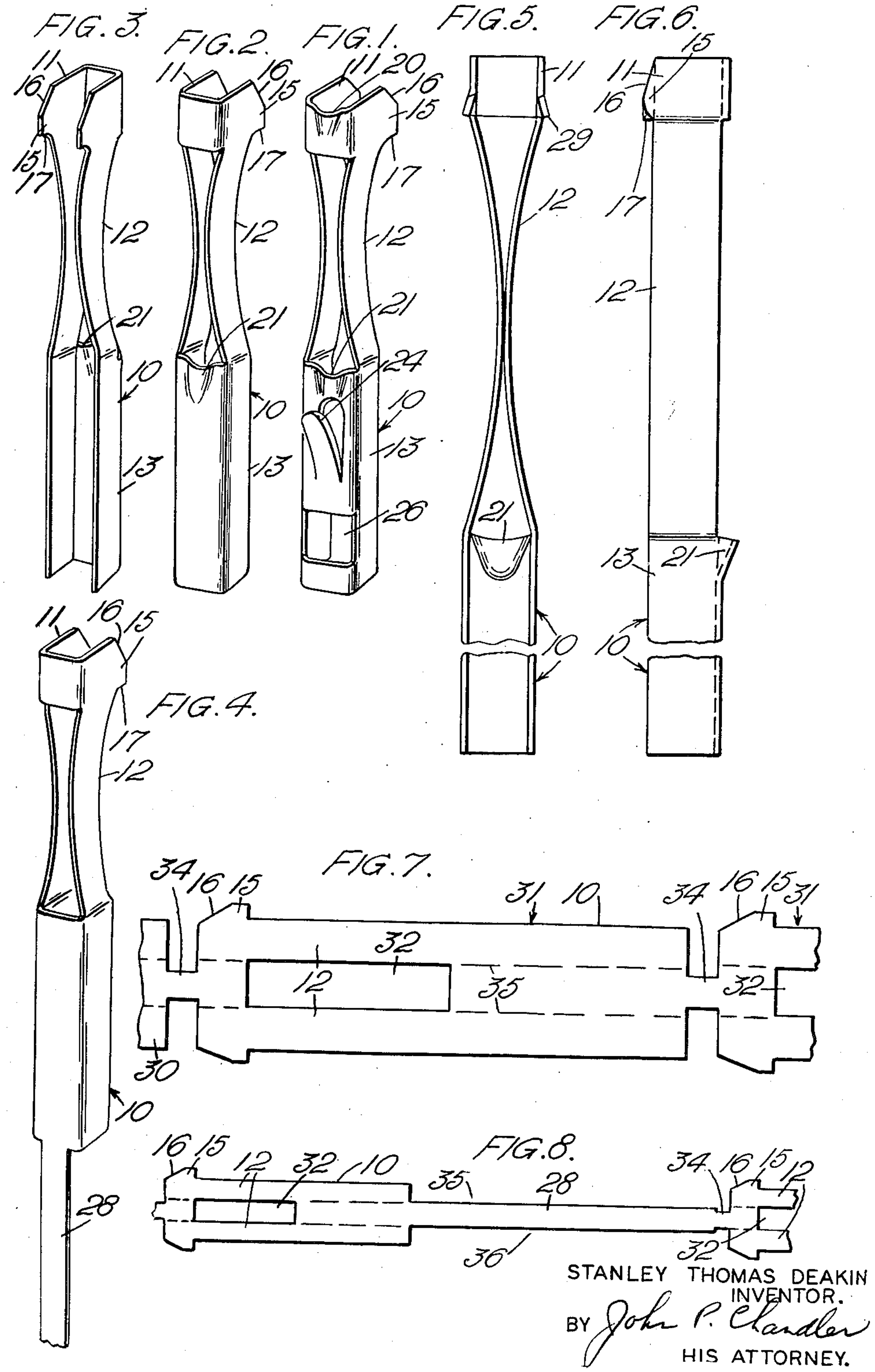
Figures 9, 10, 11, 12, 13, 14, 15, 16, 17:
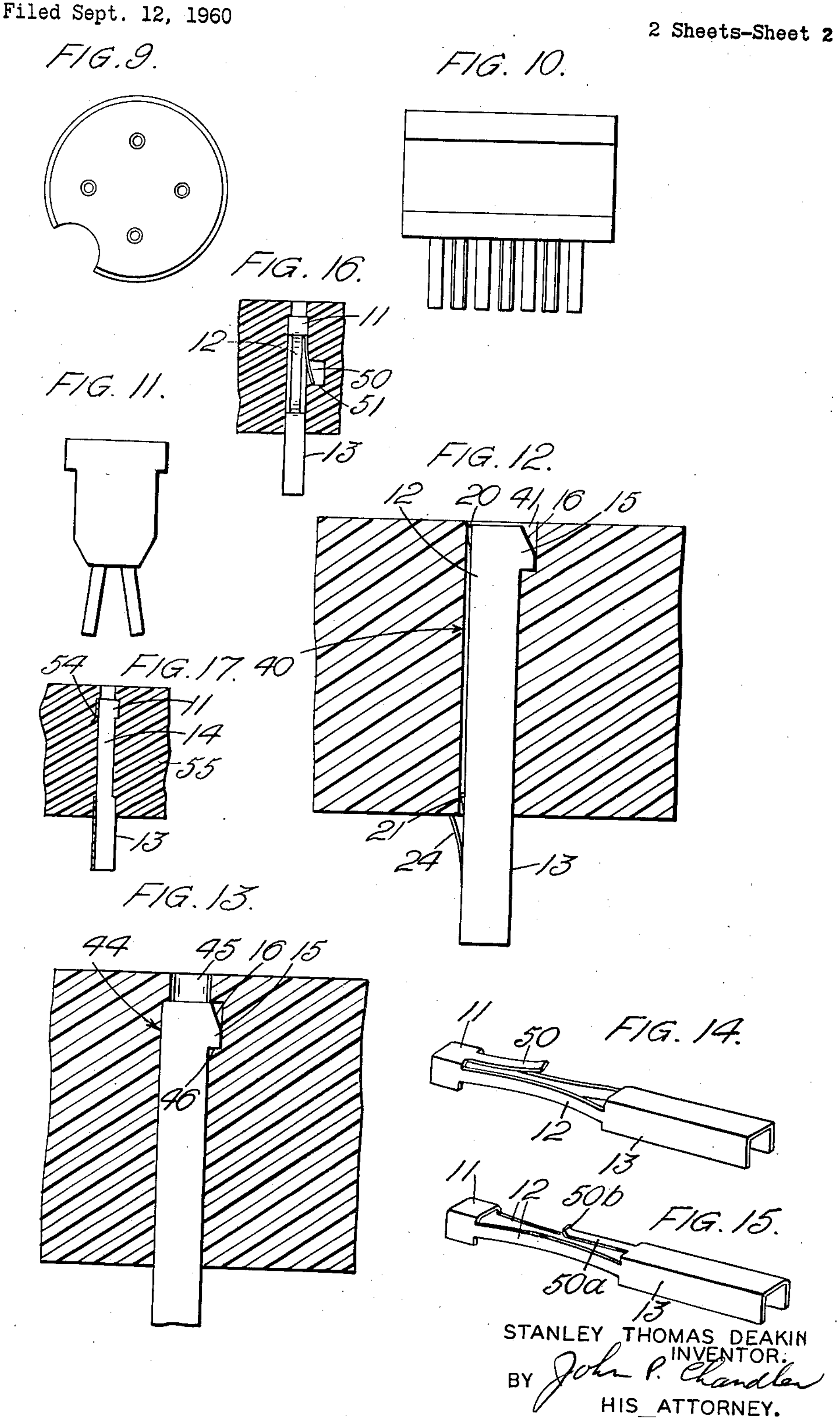

Some specific examples of contacts according to the invention and their manufacture and use will now be described with reference to the accompanying drawings, in which:

FIGURE 1 is a perspective view from the back and one side of one form of contact, FIGURE 2 is a view, similar to FIGURE 1, of another form of contact, FIGURE 3 is a perspective view from the front and other side of the contact shown in FIGURE 2, FIGURE 4 is a view, similar to FIGURE 1, of another form of contact, FIGURE 5 is a front view of yet another form of contact, FIGURE 6 is a side view of the contact shown in FIGURE 5, FIGURE 7 illustrates a stage in the manufacture of any of the contacts shown in FIGURES 1–3, 5 and 6, FIGURE 8 illustrates a stage in the manufacture of contacts as shown in FIGURE 4, FIGURE 9 shows, in plan, a moulding, FIGURE 10 is a side view of another form of moulding with contacts in place, FIGURE 11 is an end view of the moulding seen in FIGURE 10, FIGURE 12 is a section through a part of a moulding showing a contact held therein, FIGURE 13 is a section through a part of another moulding with a contact held therein, FIGURES 14 and 15 are perspective views of two other forms of contact, FIGURE 16 shows the contact of FIGURE 14 in a moulding, and FIGURE 17 shows a modified form of the construction shown in FIGURE 13.

The contacts forming the subject of these examples are intended for use in holders for sub-miniature valves, lamps and crystals.

Each contact is, basically, in the form of a channel 10 of thin, gold-plated, beryllium copper. At one end, 11, the mouth of the contact in use, the channel is complete for a short distance, there is then an intermediate portion 12 of substantial length (e.g. about one-half the total length of the contact channel) over which the base portion of the channel is removed and the remainder, 13, of the contact the channel is again complete, or substantially so. Over the intermediate portion 12, the side walls are bowed inwardly until they touch or nearly touch, thereby providing internal, resilient, contact surfaces with a long, smoothly curved inlet guide ramp. At the mouth of the contact there are projections 15 from the side walls, lying in, or mainly in, the planes thereof. These projections, which are to assist in holding the contact in a moulding, are chamfered at the mouth end, as seen at 16, and project at right angles from the walls adjacent the intermediate portion, as seen at 17.

In the example, shown in FIGURE 1, the base of the channel at the mouth is deformed outwardly to provide a tapered guide ramp 20 for a contact pin, the ramp being concavely curved about the longitudinal axis of the channel.

In another construction, shown in FIGURES 2–5, the base of the channel at the end of the intermediate portion remote from the mouth is similarly deformed as seen at 21 or the base may be deformed at both positions, as shown in FIGURE 1.

There is also shown, in FIGURE 1, a tongue 24 which is cut out of the base of the channel on the side of the intermediate portion remote from the mouth. This tongue extends towards the intermediate portion and serves to assist in holding the contact in a moulding by engagement with a face of the moulding or a step thereon.

In each of the above examples the channel portion 13 remote from the mouth may serve as a contact tag to which a lead wire may be soldered and in one construction (see FIGURE 1) the base of the channel is formed with an aperture 26 for a wire or solder. The channel shape also permits long contact pins or wires to pass right through the socket contact.

In another example, see FIGURE 4, the base of the channel is extended beyond the end of the socket portion, the side walls being removed over the extension, and forms a tag 28 which may, for example, be soldered to a printed circuit or to a contact on some other part of an installation.

In the example shown in FIGURES 5 and 6 the corners 29 of the projections are splayed outwardly.

To manufacture the contacts, a continuous flat strip, 30, FIGURE 7, is first punched to provide a succession of similar blanks 31. Each blank has a rectangular central aperture 32 extending lengthwise of the strip at the intermediate portion and two lateral projections 15 at one end of the blank. The blanks are joined by narrow necks 34. The sides of the strip are then bent up along the chain lines 35 to channel form, the strip is plated and the contacts severed from the strip by removal of the necks 34. When the contacts are to have extended tags as above described, each alternate contact in the strip is omitted (see FIGURE 8) and its place taken by long notches 36 cut in the sides of the strip to leave only the centre portion 28 which forms the tag.

The contacts may be held in plastic mouldings either singly or in multiple contact socket members. In the latter case they may be arranged in the form of a ring (FIGURE 9) or in parallel rows (FIGURES 10 and 11). When in rows the contacts may diverge outwardly from the rows in known manner and as seen in FIGURE 11, to give increased separation of the contact tags.

FIGURE 12 shows a contact as shown in FIGURE 1 and having a tongue 24 held in a moulding. The moulding has a rectangular throughway with an enlarged end 41 providing a step 42. The contact is inserted downwardly, as seen in the figure, until the projections 15 engage on the step and the tongue 24 springs out to engage the underside of the moulding and prevent withdrawal of the contact.

In FIGURE 13 the plastic has a rectangular section passageway 44 which terminates in a short portion 45 of circular section. The step at the lower end of the portion 45 holds the contact against movement in one direction. Movement of the contact in the other direction is prevented by a step 46 on the moulding engaging under the projections 16. The step 46 may be produced by moulding or closing the plastic onto the contact after insertion.

The contact shown in FIGURE 14 has a resilient tongue 50 cut from the base and arranged, as seen in FIGURE 16, to engage in latching relation against a step 51 in a moulding.

FIGURE 15 shows a modification of the contact of FIGURE 14 in which the tongue 50*a* has a hook 50*b* which engages over the step 51.

In FIGURE 17 the contact has a stiff lip 54 bent out from the base of the channel portion 11 to make holding engagement in a moulding 55 of resilient material.

The terms "upper" and "lower" as used herein and in the appended claims are employed only for consistency with most of the figures of the drawing and are not used in any limiting sense.

I claim:

1. An electrical socket contact in the form of a channel of resilient metal to be received in a vertical throughway in a supporting receptacle, the base of the channel being omitted from the side walls along an intermediate portion of the length of the member adjacent the upper end of the channel, thus leaving a pair of spaced webs along the base of the channel between said side walls, the side walls of the channel being bowed inwardly along said portion to provide, within the channel shape, resilient contact surfaces for engagement with a pin or the like inserted lengthwise into the mouth of the channel formed at its upper end, and means for securing the channel in the throughway against downward and upward movement.

2. The structure recited in claim 1 wherein said latter means includes, respectively, a horizontal projection along an edge of one side wall which may engage a portion of the throughway in the structure, and a struck-out projection whose upper end engages the lower wall of the receptacle.

3. The structure recited in claim 1 wherein said latter means include struck-out portions of the channel forming horizontal edges which engage portions of the receptacle in locking relation.

4. An electrical socket contact in the form of a channel of resilient metal to be received in a vertical throughway in a supporting receptacle, the base of the channel being omitted from the side walls along an intermediate portion of the length of the member adjacent the upper end of the channel, thus leaving spaced connecting webs between said side walls, the side walls of the channel being bowed inwardly along said portion to provide, within the channel shape, resilient contact surfaces for engagement with a contact pin inserted into the mouth of the channel formed at its upper end, and means for securing the channel in the throughway including a shoulder formed at the upper end of the channel which may engage a projection formed in the receptacle throughway limiting downward movement, and a struck-out tongue at the lower end of the channel limiting upward movement.

5. The structure recited in claim 4 wherein the lower end of the contact is formed with a projection extending below the receptacle to which a wire may be secured.

6. The structure recited in claim 4 wherein the channel base at the mouth is deformed outwardly to provide a tapered guide ramp for the contact pin.

7. An electrical socket contact in the form of an elongated channel of spring metal which can be inserted in a receptacle having an elongated vertical throughway of such size as to receive the channel and having a recess forming a stop adjacent its upper end, the channel being formed with opposed side walls and a connecting base wall, the upper end of the channel forming a mouth to receive a male contact member, a right angular shoulder on said side walls below said upper end to engage the stops and limit downward movement of the channel, a section of the base wall below said upper end being removed and the adjacent side walls in said section being inwardly bowed to form spring contacts engaging the male contact, the lower end of one of the walls having a punched-out, inverted, U-shaped tongue whose upper end engages the lower end of the receptacle to prevent removal thereof, a lower terminal section extending below said lower end and forming a contact tag to be secured to an electrical connector.

References Cited in the file of this patent

UNITED STATES PATENTS 2,468,368 Jackson ---------------- Apr. 26, 1949

FOREIGN PATENTS 893,066 Germany ---------------- Oct. 12, 1953

Notice of Adverse Decision in Interference

In Interference No. 93,369 involving Patent No. 3,047,832, S. T. Deakin, ELECTRICAL SOCKET CONTACTS, final judgment adverse to the patentee was rendered May 12, 1965, as to claim 1.

[*Official Gazette June 22, 1965.*]